US007873527B2

(12) United States Patent
Dordick et al.

(10) Patent No.: US 7,873,527 B2
(45) Date of Patent: Jan. 18, 2011

(54) INSURANCE FOR SERVICE LEVEL AGREEMENTS IN E-UTILITIES AND OTHER E-SERVICE ENVIRONMENTS

(75) Inventors: Rowan L. Dordick, Briarcliff Manor, NY (US); Asit Dan, Pleasantville, NY (US); Kazuo Iwano, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 1567 days.

(21) Appl. No.: 10/437,745

(22) Filed: May 14, 2003

(65) Prior Publication Data
US 2004/0230459 A1 Nov. 18, 2004

(51) Int. Cl.
G06Q 40/00 (2006.01)
(52) U.S. Cl. ............................................ 705/4; 705/7
(58) Field of Classification Search .................. 705/4
See application file for complete search history.

(56) References Cited

U.S. PATENT DOCUMENTS

| 6,148,290 | A | 11/2000 | Dan et al. ...................... 705/1 |
|---|---|---|---|
| 6,366,563 | B1 | 4/2002 | Weldon et al. ............... 370/252 |
| 6,459,682 | B1 | 10/2002 | Ellesson et al. .............. 370/235 |
| 6,868,386 | B1* | 3/2005 | Henderson et al. ............. 705/4 |
| 7,020,692 | B2* | 3/2006 | Cianciarulo et al. ......... 709/217 |
| 2002/0046065 | A1 | 4/2002 | Nighan |
| 2002/0091539 | A1 | 7/2002 | Yin et al. |
| 2002/0095317 | A1* | 7/2002 | McCabe ......................... 705/4 |
| 2002/0111725 | A1* | 8/2002 | Burge .......................... 701/29 |
| 2002/0143920 | A1 | 10/2002 | Dev et al. |
| 2002/0198744 | A1* | 12/2002 | Sagalow et al. ................ 705/4 |
| 2003/0009347 | A1* | 1/2003 | Iwai et al. ....................... 705/1 |
| 2003/0167178 | A1* | 9/2003 | Jarman et al. .................. 705/1 |
| 2004/0093242 | A1* | 5/2004 | Cadigan et al. ................ 705/4 |
| 2005/0267783 | A1* | 12/2005 | Zaccaria et al. ................ 705/4 |

OTHER PUBLICATIONS

Deborah Radcliff, Calculating E-Risk, Computerworld, Feb. 12, 2001, www.computerworld.com.
Gary H. Anthes, Brave New OS, Computerworld, Feb. 11, 2002, www.computerworld.com.
Innovative E-Business Insurance Protection for Customers of Counterpane Internet Security, Inc., Counterpan : Media Releases: Lloyd's of London—White Paper, Oct. 24, 2002, www. counterpane.com/pr-lloydswp.html.

* cited by examiner

Primary Examiner—R. D Rines
(74) Attorney, Agent, or Firm—Ido Tuchman; Louis Percello

(57) ABSTRACT

A method and system for indemnifying an insurance purchaser by an insurance provider against losses resulting from specified events. In one embodiment, the specified events include quality of service penalties of a service level agreement between a service provider and service purchaser. The invention may include at least one risk metric monitored via a communication network, such that a premium payable to the insurer by the insurance purchaser is dependent on the risk metric. In a particular configuration of the invention, the risk metric is monitored in real-time or near real-time.

17 Claims, 3 Drawing Sheets

INSURANCE FOR SERVICE LEVEL AGREEMENTS IN E-UTILITIES AND OTHER E-SERVICE ENVIRONMENTS

FIELD OF THE INVENTION

The present invention generally relates to insurance policies, and more particularly to liability protection configured to protect against quality of service penalties.

BACKGROUND

For many companies, individuals, and institutions, access to the Internet is typically achieved using a service provider. Service providers generally deliver various computer services to entities by means of computer networks. For example, service providers often offer such services as website hosting, electronic commerce, email, and network connectivity services.

Entities that rely on Internet communication or commerce for their day-to-day affairs may not only be interested in the type of service a service provider offers, but also the quality of its service. To attract these customers, service providers will often promise a quality of service level that, should they fall below, obligates the service provider to pay penalties to the customer. Such a promise is often expressed in a service level agreement between the service provider and the customer. Absent a service level agreement, a service provider may still be liable for service penalties by law as a result of its representations, advertising, or industry standards. Thus, the service provider may be exposed to quality of service liability as a result of either express or implied service agreements with its customers.

Quality of service guarantees can come in many forms. A guarantee may specify how quickly or how often a technical assistant is made available to the customer. Thus, quality of service penalties may result from not having enough technical assistants immediately available to speak with customers. Penalties may also result from not having enough bandwidth to meet its customers' collective throughput level at a particular time. Regardless of the type of quality of service liability the service provider is exposed to, the amount of penalties paid by the service provider could mean the difference between success and failure for the service provider.

In general, many service providers assume that not all of their customers will require peak service at the same time. This situation is similar to an electric company assuming that not all its customers will require peak electricity at any particular point in time. Thus, a service provider may not have the capability to service each customer at peak demand levels at the same time. By not having the infrastructure in place to provide peak service to all its customers at the same time the service provider takes on even greater quality of service liability. Nevertheless, such an operating model is often the only way for service providers to offer their services at competitive prices.

Insurance policies are known in the art as a means of offsetting risk of financial loss. The purpose of insurance is to provide economic protection against losses incurred due to the occurrence of a chance event. Various types of insurance policies are used to mitigate various types of risks. For example, fire insurance can be purchased to protect against the risk of property damage and economic loss due to fire.

Conventional insurance policies are generally static in nature. Once an insurance policy is purchased, factors affecting the insurance company's exposure to liability are reviewed infrequently. Thus, conventional insurance programs are often ill suited to account for frequent situational changes that may affect risk of loss.

SUMMARY OF THE INVENTION

In view of the foregoing, the present invention provides liability protection to service providers and other entities that helps reduce exposure to quality of service penalties and the like. Thus, the invention can be employed to protect service providers from unforeseen circumstances that may otherwise be economically disastrous to service providers. It should be understood that the present invention is not limited to service providers and quality of service penalties, and may be applied to other businesses, products, and services.

Therefore, one aspect of the invention is a method for indemnifying against quality of service penalties of a service level agreement between a service provider and service purchaser. The method includes a receiving operation to receive an insurance premium from the service provider. A providing operation provides insurance to the service provider against the quality of service penalties. Quality of service penalties may arise from, for example, unavailability of service, unavailability of human resources, or delay in recovery from a service problem. Furthermore, the method may include a monitoring operation for monitoring at least one risk metric via a communication network, wherein the risk metric indicates a likelihood that quality of service penalties will occur.

Another aspect of the invention is an insurance system for indemnifying a service provider against quality of service penalties of a service level agreement between the service provider and a service purchaser. The insurance system includes an insurance policy provided by an insurer against the quality of service penalties. A premium in the system is made payable to the insurer by the service provider. In addition, compensation is paid by the insurer to the service provider for quality of service penalties occurring within terms of the insurance policy. The insurance system may include at least one risk metric to be monitored via a communication network, wherein the risk metric indicates a likelihood that the quality of service penalties will occur.

A further aspect of the invention is a method of indemnifying an insurance purchaser by an insurance provider against a loss resulting from at least one specified event. The insurance purchaser and insurance provider are coupled to a communication network, and the method includes a receiving operation for obtaining an insurance premium from the insurance purchaser. A monitoring operation is performed to monitor at least one risk metric via the communication network, wherein the risk metric indicates a likelihood that the specified event will occur. An adjusting operation adjusts the insurance premium according to changes in the at least one risk metric.

Yet another aspect of the invention is a system for indemnifying an insurance purchaser against loss. The system includes an insurance policy provided by an insurer against the loss. The loss may, for example, be a quality of service penalty. The system also includes at least one risk metric monitored via a communication network, wherein the risk metric indicates a likelihood that the loss will occur. The system further includes a premium payable to the insurer by the insurance purchaser, wherein the premium is dependent on the risk metric. In a particular configuration of the invention, the system may monitor the risk metric in real-time.

The foregoing and other features, utilities and advantages of the invention will be apparent from the following more particular description of various embodiments of the invention as illustrated in the accompanying drawings.

DETAILED DESCRIPTION OF THE INVENTION

Figure 1:
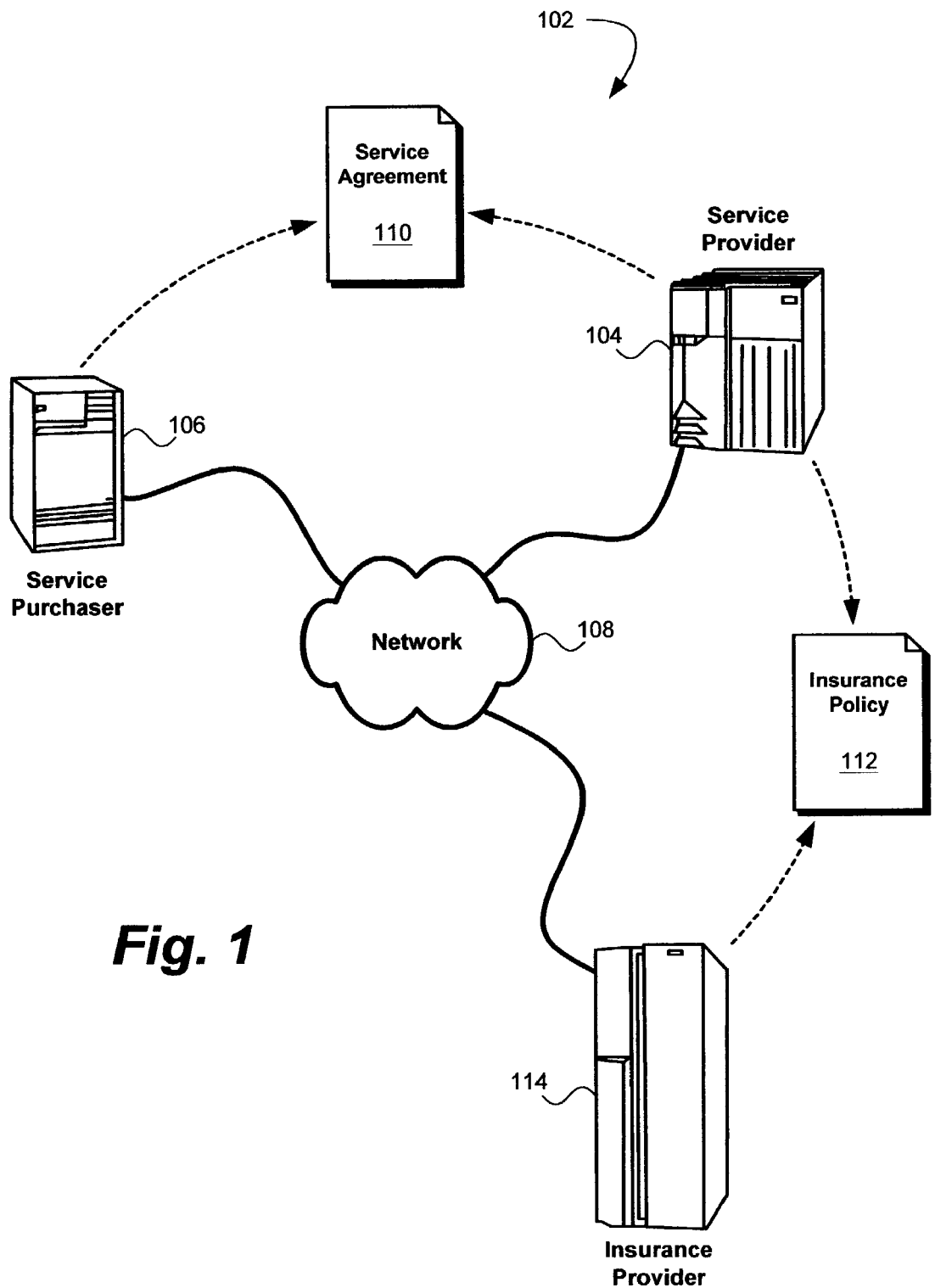
FIG. 1 shows an exemplary network environment embodying the present invention.

The following description details how the present invention is beneficially employed to indemnify service providers against service agreement penalties. It should be noted, however, that this is only one embodiment of the invention and that the invention is not limited to service providers or service agreement penalty insurance. As discussed below, the invention may be utilized to insure and protect various other entities against various other forms of liabilities. Thus, principles of the present invention may be applied to medical insurance, automobile insurance, home insurance, commercial insurance and other insurance agreements known to those skilled in the art without departing from the spirit and scope of the invention. Throughout the description of the invention reference is made to FIGS. 1-3. When referring to the figures, like structures and elements shown throughout are indicated with like reference numerals.

In FIG. 1, an exemplary network environment 102 embodying the present invention is shown. The environment 102 includes a service provider 104 and a service purchaser 106 coupled to a computer network 108. The computer network 108 may be any network known in the art for effectuating communications between the various nodes within the network environment 102. Thus, the network 108 can be a local area network (LAN), a wide area network (WAN), or a combination thereof. It is contemplated that the network 108 may be configured as a public network, such as the Internet, and/or a private network, and may include various topologies and protocols know to those skilled in the art. In other embodiments of the invention, the network 108 is representative of any communication means between the various entities within the network environment 102. Furthermore, it should be noted that the network environment 102 is presented for illustration purposes only, and is representative of countless system configurations in which the invention may be implemented. Thus, the present invention should not be considered limited to the environment configuration shown herein.

Typically, the service provider 104 sells services and/or products carried over the network 108 to the service purchaser 106. The service provider 104 may, for example, offer website hosting services to the service purchaser 106. It is contemplated that other alternative and additional services may be offered by the service provider 104, such as mass storage services, electronic payment services, call center services, data processing services, application hosting services, or application for rent services. Thus, it is understood that the present invention may be applied to service providers offering a variety of services and/or products to perspective customers.

In general, the service provider 104 and service purchaser 106 enter into a service agreement 110 with each other. An explicit service agreement 110 often specifies the price to be paid by the service purchaser 106 for the service or services received from the service provider 104. Furthermore, the agreement 110 typically stipulates quality of service requirements that the service provider must achieve, as well as service penalties that the service provider 104 will pay to the service purchaser 106 in the event that the service fails to meet recited quality standards. The quality of service requirements may vary from customer to customer, and may detail such service aspects as availability of service (i.e., maximum downtime per week), network performance (i.e., minimum available bandwidth per second), redundancy (i.e., frequency of data backups), access to human administrators (i.e., technical support availability), time to recover from certain unavoidable problems, etc. Depending on the service, the terms of the service agreement 110 may include business process level guarantees. For example, the service level agreement 110 may specify a time to perform a certain business task such as delivery of an item in response to a customer request or purchase order. The service level agreement 110 may include other business level terms and conditions, such as obligations to buy, and pricing and product availability.

Absent an explicit service level agreement 110, the service provider 104 may still be liable for not achieving quality of service levels. Such liability generally results from an implicit service agreement created between the service provider 104 and the service purchaser 106 as a result of representations made by the service provider, advertising or de facto industry standards. It is therefore contemplated that the present invention may still be utilized when no explicit service agreement 110 or an incomplete service agreement 110 exists between the service provider 104 and the service purchaser 106.

In undertaking to provide service to the service purchaser 106, the service provider 104 typically assumes a certain degree of risk as a result of explicit or implicit quality of service guarantees. Some risk may be involuntarily assumed by the service provider 104, while other risk may be voluntary. Involuntary risk includes risk that cannot be easily controlled by the service provider 104. Such involuntary risk includes risk from fire, theft, personnel errors, fluctuations in service demand, market conditions, and so on. Voluntary risk, on the other hand, involves more controllable aspects of the service provider's business that contribute to how often the service provider 104 violates the quality of service guarantees and incurs penalties. Examples of voluntarily assumed risk include the amount of resources devoted by the service provider 104 to the service purchaser 106 and the service level guarantees made.

While service providers may seek to minimize voluntary risk, there is often a balance that must be struck between the amount of voluntary risk assumed and the infrastructure needed to eliminate risk. In other words, the service provider 106 may not provide enough resources to meet aggregate peak demands across all its customers because it assumes that not all customers would demand such service levels at the same time. To be profitable, the revenues must exceed the penalties, but to eliminate penalties more resources must be present, thereby increasing service costs. A provider's ability to avoid costly services could spell the difference between profitability and failure. Yet, given the large number of unknowns, few if any service providers 106 could hope to meet the objectives of the service agreement 110 one hundred percent of the time.

Figure 2:
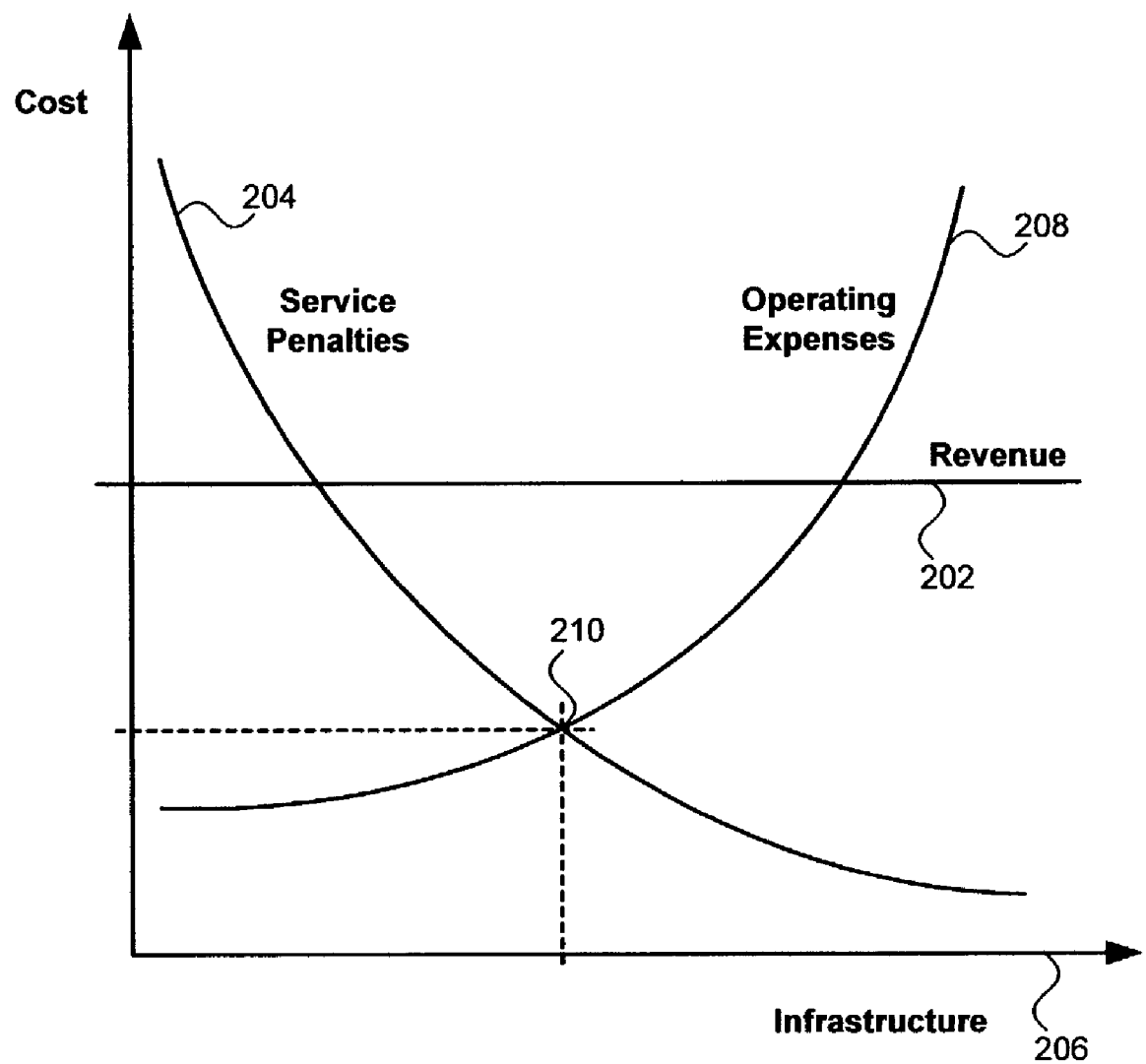
FIG. 2 shows a graph illustrating a typical relationship between various financial decisions faced by a service provider.

In FIG. 2, a graph is presented to illustrate the typical relationship between various financial decisions faced by a service provider. As depicted, at a particular revenue level 202, service penalties 204 paid by a service provider are, in general, inversely proportional to the amount of infrastructure 206 devoted to the service purchaser. In other words, as the service provider installs better equipment, hires more employees, and upgrades its software, the amount of service penalties 204 the service provider has to pay decreases.

On the other hand, as the service provider increases its system infrastructure 206, its operating expenses 208 also increase. An increase in system infrastructure typically requires more capital investment, additional employees, and increased equipment maintenance. Thus, it is observed that when the service provider's infrastructure 206 is too high (right side of the graph), the operating expenses 208 can become prohibitive. In addition, it is observed that when the service provider's infrastructure 206 is too low (left side of the graph), the cost of service penalties 204 can also become too high. Consequently, there may be an operating point 210 beyond which a reduction in service penalties 204 is outweighed by the additional operating expenses 208. At this point, some anticipated service penalties 204 are justified. Although the service provider may expect a level of service penalties, the present invention offers a novel means of protection to the service provider against excessive penalties.

Returning to FIG. 1, the service provider 104 executes an insurance policy 112 with an insurance provider 114 to protect against excessive service penalties. Thus, the insurance policy 112 is structured so that the insurance provider 114 receives insurance premiums from the service provider 104 and supplies insurance to the service provider 104 against the quality of service penalties. As discussed above, quality of service penalties may arise from, for example, service interruption, unavailability of human resources, performance degradation, delay in recovery from a service problem, or too little support.

Thus, one embodiment of the present invention allows companies that are dependent on service agreements 110 (both service providers 104 and service purchasers 106) to buy insurance products to hedge this risk. The insurance products can be dynamic in the sense that they can be bought on the fly in response to changing conditions or anticipated events, such as variations in customer workload demand, bandwidth, performance bottle necks, hardware or software fails, etc. In some instances, the insurance provider 114 may sell the insurance products in advance for a fixed term, like traditional insurance, where depending on the business being insured (i.e., service provider 104 or service purchaser 106), the insurance provider 114 takes into account details of the service agreement guarantees committed to by the service provider 104 or received by the service purchaser 106, along with a risk assessment model.

Conventional insurance policies, such as medical insurance, fire insurance, and automobile insurance, typically require that risk of loss of insured interest be fairly static. The present invention differs from these conventional insurance polices, in that the insured interest (i.e., quality of service) is fairly dynamic. As described below, insuring against quality of service penalties generally requires diligent monitoring of one or risk metrics that may affect the insurance risk of the insurance provider 114. Thus, as the service provider 104 amasses new service purchasers 106, negotiates different service agreements 110, and changes its infrastructure, the insurance provider 114 of the present invention quickly responds accordingly, thereby maintaining an acceptable premium-to-risk ratio.

It is contemplated that the insurance provider 114 uses a risk assessment model to determine the cost and coverage of the insurance policy 112. The risk assessment model may require knowledge of the service provider's committed service agreements 110 and allocated resources. In addition, the risk assessment model may input the service purchaser's behavior, such as workload and support requirements. In one embodiment of the invention, the insurance provider 114 may monitor one or more aspects of the service provider's business in order to create and refine a risk assessment model. For instance, the insurance provider 114 may request service infrastructure data or historical service data from the service provider 104. Such data can give the insurance provider 114 a more complete and accurate model of the insurance risk posed by the service provider 104. Consequently, the data can be used to better assess the premiums needed to offset the insurance risk posed by the service provider 104.

In a more particular embodiment of the invention, the insurance provider 114 electronically monitors at least one measurable metric affecting the insurance risk posed by the service provider 104 over the network 108. It is contemplated that the insurance provider 114 may monitor the metric at predefined time intervals or may receive an asynchronous notification when the metric changes. Metric monitoring may be real-time. As used herein, "real-time" includes the exact moment of an event occurrence or very close to it (i.e., near real-time). Data from such monitoring may be utilized to either reassess the existing insurance policy 112 or to ensure that terms of the insurance policy 112 are not being violated.

The various components of the insurance risk can be evaluated to a first approximation as step functions of certain fixed intervals. Thus, for each factor, a nominal "neutral" value would be assigned. That is, if all the risk factors were at or below their neutral values, the service provider 104 would have a high probability of meeting its profit objectives. To carry out the approximation, an algorithm could assign a value, such as one unit above the neutral value or two units below it, for each interval in some future range, where the size of the interval would depend on the nature of the service agreement 110 and the kinds of risks involved. While, in general, the uncertainty would increase in time, some intervals might be more predicable because of fixed events, such as time of day, scheduled events or historically know behavior.

Figures 3A, 3B:
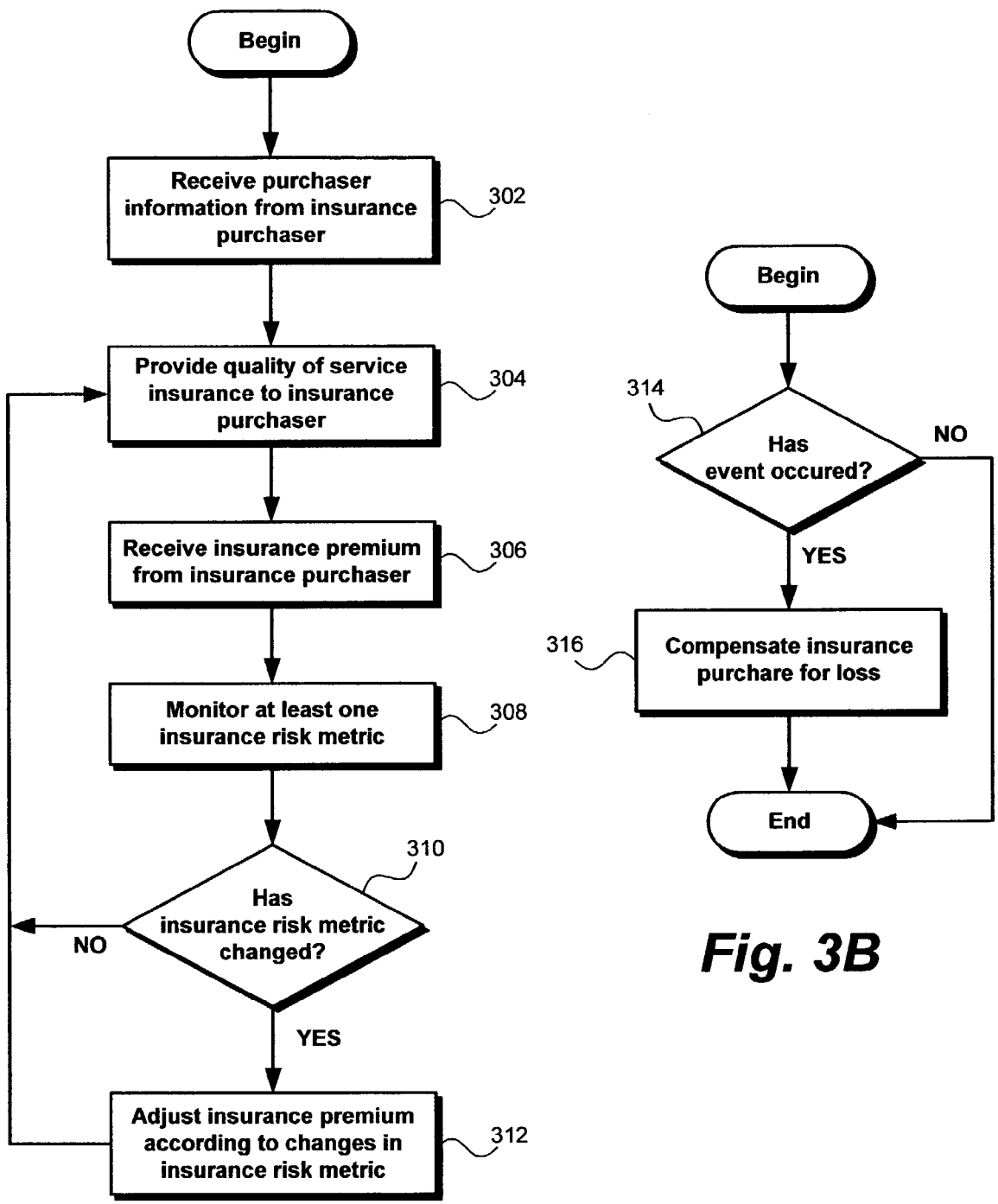
FIGS. 3A and 3B show exemplary flowcharts for indemnifying an insurance purchaser by an insurance provider against a loss resulting from at least one specified event, as contemplated by the present invention.

In FIGS. 3A and 3B, flowcharts for indemnifying an insurance purchaser by an insurance provider against a loss resulting from at least one specified event, as contemplated by one embodiment of the present invention, are shown. It should also be remarked that at least some of the logical operations shown may be implemented (1) as a sequence of computer executed steps running on a computing system and/or (2) as interconnected machine modules within the computing system. The implementation is a matter of choice dependent on the performance requirements of the system implementing the invention. Accordingly, the logical operations making up the embodiments of the present invention described herein are referred to alternatively as operations, steps, or modules.

Operational flow begins with receiving operation 302. During this operation, the insurance provider receives a request for insurance coverage from the insurance purchaser. The request is typically accompanied with or followed by information about the insurance coverage required by the insurance purchaser, and includes the event or events that the insurance purchaser wishes to be protected against, as well as the amount of protection required. In the example where the insurance purchaser is a service provider, the information received may be a request for insurance against quality of service penalties. The information may specify the amount of insurance coverage, deductibles and premiums. Furthermore, the information may describe the service provider's infrastructure, customer usage, service agreements, and various other attributes that may affect the service provider's exposure to quality of service penalties. After the receiving operation 302 is completed, flow continues to providing operation 304.

At providing operation 304, the insurance provider grants an insurance policy to the insurance purchaser indemnifying against loss occurring as a result of the event or events specified. This operation may also encompass any screening and approval procedures that the insurance provider may have. The insurance provider uses the information received from receiving operation 302, as well as information gathered from other customers and sources to determine the amount of insurance coverage, if any, and the cost of the insurance policy. It is contemplated that premium rates may initially be based on those for analogous risks in other areas of business or e-business, supplemented by the insurer's historical (even if only recent) information about a large number of service providers and their ability to satisfy various kinds of service level agreements. In a particular embodiment of the invention, a risk assessment model is created of each insurance purchaser. The risk assessment model dictates the amount of loss covered by the insurance provider and the cost of the insurance policy.

Next, at receiving operation 306, the insurance provider receives payment for the insurance from the insurance purchaser. It is contemplated that the insurance payment transaction may be made electronically over a computer network, or though traditional payment means. After the receiving operation 306 is completed, process flow continues to monitoring operation 308.

At monitoring operation 308, the insurance provider monitors at least one insurance risk metric via the communication network. As used herein, an insurance risk metric is a measurable parameter that helps predict the likelihood that the specified event or events will occur in the future. Thus, what the insurance risk metric is depends upon what the specified events in the insurance policy are. For example, if the specified event is network unavailability for a service provider, the insurance risk metrics may include, but are not limited to, the amount of data transferred to and from a service provider, the amount of disk space utilized by a service provider's customers, the number of logged calls to a technical support phone number, the number of customers being serviced by the service provider, the number of service agreements entered into by the service provider, and so on.

In one embodiment of the invention, the insurance provider automatically monitors the insurance risk metrics at regular intervals via the network. For example, the insurance provider may check a risk metric's value every minute or every hour. In another embodiment the insurance provider is automatically notified when the metrics have significantly changed. For example, the insurance provider may be automatically notified when a risk metric has changed beyond a threshold percentage of its value.

As mentioned above, risk metrics may be monitored over a communication network. The communication network may be utilize various communication technologies known in the art, including wired networks, wireless networks, optical networks, and so on. After the monitoring operation 308 is completed, control passes to query operation 310.

At query operation 310, the insurance provider checks whether there has been a change to any of the measured risk metrics. If no change has occurred, control returns to providing operation 304. If, on the other hand, there has been a change to any of the measured risk metrics, control passes to adjusting operation 312.

At adjusting operation 312, the insurance provider adjusts the insurance premium according to changes in the insurance risk metric. Thus, if the likelihood that the specified event will occur in the future decreases, the insurance provider may lower the insurance premium. Conversely, if the likelihood that the specified event will occur in the future increases, the insurance provider may raise the insurance premium. It is contemplated that the amount of increase or decrease in insurance premium is dependent on the risk assessment model created for the insurance purchaser. After adjusting operation 312 is completed, control returns to providing operation 304.

As shown in FIG. 3B, if, at query operation 314, it is determined that an event specified in the insurance policy has occurred, control passes to compensating operation 316. During this operation, the insurance compensates the insurance purchaser for the loss incurred as a result of the event occurrence, as specified in the insurance policy.

It is contemplated that the present invention may utilize software agents to locate, negotiate, buy, sell and monitor insurance policies. Business would endow the agents with policies, which may be updated as necessary, and algorithms to translate policies into actions. For example, a policy would specify the degree of risk, the amount of coverage needed for different types of risk, etc. The algorithms can assess the risk based on whatever knowledge the agents could acquire. After assessing or inferring the likely risks for various periods, the agents then calculate optimum insurance coverage (the amount and duration), and then purchase or sell it. The policies and algorithms could be offered as web services, and would include rules, which each business could customize, specifying such parameters as profit objectives, loss limits, etc. If situations arose in which conflicts between competing goals could not be resolved within a policy's tolerance range, a rule could be inserted that human administrators should be alerted and be given an opportunity to intervene; otherwise, the system would operate automatically.

It is further contemplated that insurance companies would require special software to negotiate with electronic agents and third parties would offer software for specifying business policies in regard to service agreement insurance, as well as algorithms or even "agent tool kits" to handle the entire process, from risk assessment to the purchase of insurance.

In one embodiment of the invention, each service agreement would be assigned one or more agents that would operate under the guidance of policies set by the service provider or the insurance provider, some of which would be standard and other tailored to a particular service agreement. At fixed intervals or at moments triggered by certain events, which might range from changes in relevant factors such as workload, physical disruptions somewhere in the network, economic indicators, holidays, advertisements, threats of terrorist attack, etc., the agents would calculate a risk value. In some cases, a continual calculation of risk factors would occur. The information needed by the agents would be supplied to them, e.g., through publish/subscribe services or through other agents designed to search online information sources. In addition, information acquired from public or private sources could be further processed and refined to extract all possible information relevant to risk assessment.

The foregoing description of the invention has been presented for purposes of illustration and description. It is not intended to be exhaustive or to limit the invention to the precise form disclosed, and other modifications and variations may be possible in light of the above teachings. Thus, the embodiments disclosed were chosen and described in order to best explain the principles of the invention and its practical application to thereby enable others skilled in the art to best utilize the invention in various embodiments and various modifications as are suited to the particular use contem-

The invention claimed is:

1. A method of indemnifying an insurance purchaser by an insurance provider, the method comprising:
   receiving an insurance premium from the insurance purchaser against a loss resulting from an unavailability of one or more computer services provided over a computer network, the insurance purchaser and insurance provider being coupled to a communication network;
   monitoring changes in at least one risk metric by a computer via the communication network, the risk metric indicating a likelihood that the one or more services will be unavailable over the computer network; and
   calculating an adjusted insurance premium against the loss resulting from the unavailability of the one or more computer services according to changes in the at least one risk metric; and
   wherein the at least one risk metric includes the number of logged calls to a technical support phone number.

2. The method of claim 1, wherein the at least one risk metric includes the amount of data transferred to and from the insurance purchaser.

3. The method of claim 1, wherein the at least one risk metric includes the amount of disk space utilized by the insurance purchaser's customers.

4. The method of claim 1, wherein the at least one risk metric includes the number of customers being serviced by the insurance purchaser.

5. The method of claim 1, wherein monitoring the at least one risk metric is performed in real-time.

6. The method of claim 1, further comprising compensating the insurance purchaser for the loss if the specified event occurs.

7. The method of claim 6, wherein compensating the insurance purchaser includes compensating the insurance purchaser against quality of service penalties.

8. The method of claim 1, wherein monitoring the at least one risk metric includes receiving values of the at least one risk metric periodically.

9. The method of claim 1, wherein monitoring the at least one risk metric includes receiving values of the at least one risk metric asynchronously.

10. A method of indemnifying an insurance purchaser by an insurance provider, the method comprising:
    receiving an insurance premium from the insurance purchaser against a loss resulting from an unavailability of an information storage service provided by the insurance purchaser over a computer network, the insurance purchaser and insurance provider being coupled to a communication network;
    monitoring changes in at least one risk metric by a computer via the communication network, the risk metric including an amount of data transferred to and from the information storage service; and
    calculating an adjusted insurance premium against the loss resulting from the unavailability of the information storage service according to changes in the at least one risk metric; and
    wherein the at least one risk metric includes the number of logged calls to a technical support phone number.

11. The method of claim 10, wherein the at least one risk metric includes the amount of disk space utilized by the insurance purchaser's customers.

12. The method of claim 10, wherein the at least one risk metric includes the number of customers being serviced by the insurance purchaser.

13. The method of claim 10, wherein monitoring the at least one risk metric is performed in real-time.

14. The method of claim 10, further comprising compensating the insurance purchaser for the loss if the specified event occurs.

15. The method of claim 14, wherein compensating the insurance purchaser includes compensating the insurance purchaser against quality of service penalties.

16. The method of claim 10, wherein monitoring the at least one risk metric includes receiving values of the at least one risk metric periodically.

17. The method of claim 10, wherein monitoring the at least one risk metric includes receiving values of the at least one risk metric asynchronously.

* * * * *